June 16, 1953     J. G. KREER, JR     2,642,473
WAVE TRANSLATING SYSTEM
Filed Dec. 7, 1944
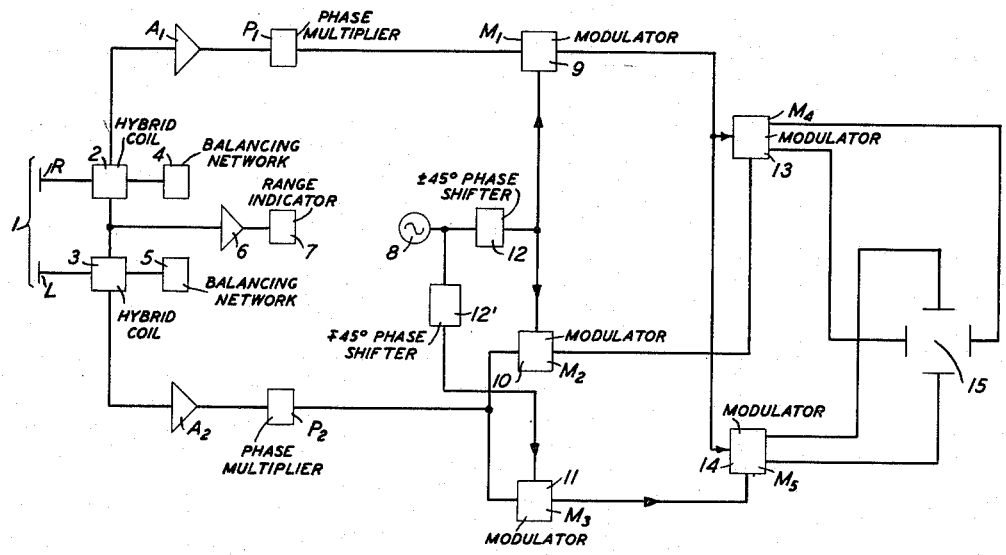
INVENTOR
J.G. KREER, JR.
BY
ATTORNEY Patented June 16, 1953

2,642,473

UNITED STATES PATENT OFFICE 2,642,473

WAVE TRANSLATING SYSTEM

John G. Kreer, Jr., Bloomfield, N. J., assignor to Bell Telephone Laboratories, Incorporated, New York, N. Y., a corporation of New York Application December 7, 1944, Serial No. 567,055

4 Claims. (Cl. 172—245)

This invention relates to phase comparison and its applications, for example, in direction finding or object location.

Representative objects of the invention are to measure phase difference and, by application of the measurement, to determine the direction of a distant object from a reference point, for example, to determine the bearing of a target in underwater sound echo ranging.

In underwater echo ranging considerable difficulty is encountered in determining the bearing of the target by the usual method which involves determination of the orientation of the receiver at which maximum echo is received. This difficulty arises partly from the fact that successive wave trains or impulses produce echoes that may vary as much as 20 decibels, for example. In addition, the propagation velocity of sound waves in water is so low that for useful ranges the interval between wave trains or impulses ordinarily is several seconds long. This period is so long that appreciable changes in bearing may occur between successive impulses.

Therefore, objects of the invention are to determine the bearing without dependence on the amplitude of the signal, and to do so by measurements of a single impulse.

The elimination of amplitude as a criterion of bearing leaves the phase parameter as a quantity from which the bearing can be determined. In one specific aspect the invention is a system which sets up a reference condition for the phase parameter that depends only upon the receiver, and which can determine the bearing completely from phase measurements on a single impulse.

In such system, the receiving pick-up device may be a crystal head or hydrophones, and may be divided into two parts having a phase difference between the signals received on the two parts. A visual indication of this phase difference is produced on a suitable indicator, as for example, a cathode-ray oscilloscope, by a system of modulators described hereinafter. The indication gives not only the sign but also the magnitude of the phase difference. The receivers are of such design that there is a unique correspondence between the electrical phase difference of these two signals and the angle of approach, at least for angles contained within the principal lobe of the directional response pattern of the receiver system. Outside this lobe the sensitivity of the pick-up is so small as to make the probability of confusion negligible.

Other objects, aspects and features of the invention will be apparent from the following description and claims.

The single figure of the drawing is a block schematic circuit diagram of a bearing indicating system embodying one form of the invention.

The circuit of the figure is a direction indicator circuit or bearing deviation indicator circuit suitable for use, for example, with underwater sound echo ranging equipment on a surface vessel.

The receiving pick-up device 1 may be, for example, a crystal type projector such as that of the system disclosed in U. S. Patent No. 2,530,528, issued to me on November 11, 1950, for Wave Translating System. The right and left halves R and L of the pick-up device 1 are two like receivers or hydrophones adapted to receive an echo from any enemy submarine or other submerged or partly submerged distant object or target (not shown). The echo signal may be, for example, of superaudible frequency, as for instance, 24 kilocycles per second.

The voltages obtained from R and L are brought to hybrid networks (bridge transformers) 2 and 3. The usual balancing networks for the hybrid networks are indicated at 4 and 5. One leg of each hybrid network is connected to the corresponding leg of the other end and the parallel combination to an amplifier 6 that feeds any suitable receiver 7, which may comprise a range indicator and may include a (demodulating) detector and means for giving aural reception of signals, as for example, signals reflected from a target or propeller noise from an enemy vessel. The other two legs of the hybrid networks are used for the bearing indication. Voltage output from them may be amplified to an appropriate level in like amplifiers $A_1$ and $A_2$. If desired, it may also be passed through like phase multipliers $P_1$ and $P_2$, employing harmonic generators as in the case of the frequency multipliers indicated for example in Fig. 36 on page 668 of Radio Engineers' Handbook, by F. E. Terman (published by McGraw-Hill Book Company, 1943).

At the output of these multipliers the signal from R goes to a modulator 9, designated $M_1$ and that from L is applied to two modulators 10 and 11 designated $M_2$ and $M_3$. These three modulators are preferably alike. Carrier voltages of a frequency different from that of the voltage outputs of $P_1$ and $P_2$ are supplied to these three modulators from a common oscillator 8, through connections including phase shifting means for producing a 90-degree phase difference between the carrier voltage applied to $M_3$ and that applied to $M_1$ and $M_2$. This phase shifting means may be, for example, two phase shifters 12 and 12', one introducing a 45-degree phase advance and the other a 45-degree phase lag, for instance in the manner of the phase shifters of E. Peterson Patent 2,006,698, July 21, 1935, or Fig. 504 on page 672 of "Wireless Direction Findings," by R. Keen (Third Edition, published by Illiffe, London); or, if desired, either 12 or 12' may be omitted and the other may introduce a 90-degree phase shift, for example, in the manner of the carrier phase shifter in R. V. L. Hartley Patent 1,666,206, April 17, 1928 or the phase splitter in Fig. 56 (d) on page 949 of the above-mentioned Radio Engineers' Handbook.

Either the upper sideband outputs of $M_1$, $M_2$ and $M_3$, or the lower sideband outputs of these three modulators, are applied to modulators $M_4$ and $M_5$ as follows: The selected sideband from the output of $M_1$ is supplied as signal to both modulators $M_4$ and $M_5$; the selected sideband from the output of $M_2$ is supplied as carrier to $M_4$; and the selected sideband from the output of $M_3$ is supplied as carrier to $M_5$. The modulators $M_4$ and $M_5$ are designated 13 and 14. They are preferably alike. Each is preferably of the balanced, conjugate input carrier suppression type, for example, as shown in Fig. 6 of the paper on "Regeneration Theory and Experiment" by Peterson, Kreer and Ware, Proceedings of the Institute of Radio Engineers, October, 1934, or in the above-mentioned Peterson patent.

The lower sideband output from these modulators $M_4$ and $M_5$ will be at zero frequency and will be proportional to the cosine and sine of the phase difference between the signal outputs from R and L as delivered by $P_1$ and $P_2$, the factor of proportionality being the same in the two cases. These direct current voltages are then applied to the deflector plates of a cathode-ray oscilloscope 15. If now a steady sinusoidal wave is received, the spot of light on the screen will be deflected along a radius vector whose angle relative to the line of one of the pairs of plates is equal to the phase difference between the original inputs as delivered by $P_1$ and $P_2$. If, however, the input is a pulse, the spot will remain centered until the pulse is received. It will then move out along the radius vector already described. In operation, the angular deflection of the radius vectors can be read coincidentally with the aural reception of an echo corresponding to the target and the reading may be calibrated directly in terms of the deviation of the bearing of the target (or of the echo signal) from the orientation of the center of the principal lobe of the pickup device.

Preferably, the pair of plates fed from the modulator $M_4$ has its axis perpendicular to the axis of the other pair of oscilloscope plates. If desired, for deflecting the cathode-ray or electron beam, the oscilloscope may employ, instead of the deflecting plates or electrostatic deflecting means, two pairs of deflecting coils or electromagnetic deflecting means with the axes of the pairs preferably mutually perpendicular. Moreover, the oscilloscope may be replaced by other indicating means. For instance, it may be replaced by an indicator such as that of the well-known Megger, the output of $M_4$ being connected to one coil of the Megger indicator, the output of $M_5$ being connected to the other coil, and the scale over which the pointer moves preferably being graduated so that the deflection of the pointer or moving beam directly indicates the desired direction or bearing deviation. (The Megger is disclosed in Fig. 17 on page 201 of Henney's Radio Engineers' Handbook, third edition, and in Fig. 10 on page 690 of volume 2 of Glazebrook's Dictionary of Applied Physics, MacMillan, London, 1922).

With either the oscilloscope or the Megger type of indicating means, if the deflection axes are perpendicular, then the angular deflections are proportional to the phase difference of the voltages delivered by $P_1$ and $P_2$. If it is desired to increase the sensitivity for some ranges of angles, then the angle between the deflection axes may be changed, an increase of the angle increasing the sensitivity over the corresponding quadrants.

What is claimed is:

1. A system for indicating the phase difference between two voltages $V_1$ and $V_2$ of given frequency, comprising five modulators A, B, C, D and E, means for supplying $V_1$ to A and supplying $V_2$ to B and C, means for supplying to A and B a carrier voltage of frequency different from said given frequency and supplying to C said carrier voltage with a phase shift of ninety degrees, means for supplying to D and E a sideband voltage from A, means for supplying a sideband voltage of the same frequency from B as a carrier voltage to D and supplying a sideband voltage of said same frequency from C as a carrier voltage to E, and means responsive to the outputs of D and E for indicating said phase difference.

2. A system for indicating the phase difference between two voltages $V_1$ and $V_2$ of given frequency comprising five modulators A, B, C, D and E, means for supplying to A said voltage $V_1$ and a carrier voltage $C_1$ of different frequency to produce a sideband voltage $S_1$ of frequency $f$, means for supplying to B said voltage $V_2$ and said carried voltage $C_1$ to produce a sideband voltage $S_2$ of said frequency $f$, means for supplying to C said voltage $V_2$ and a carrier voltage $C_2$ in quadature relation to $C_1$ to produce a sideband voltage $S_3$ of said frequency $f$, means for supplying to D said voltage $S_1$ as a signal voltage and said voltage $S_2$ as a carrier voltage to produce a lower sideband output voltage $D_1$ of zero frequency, means for supplying to E said voltage $S_1$ as a signal voltage and said voltage $S_3$ as a carrier voltage to produce a lower sideband output voltage $D_2$ of zero frequency, means responsive to $D_1$ and $D_2$ for producing non-colinear forces, and means responsive to said forces jointly for visually indicating said phase difference.

3. A system for indicating phase difference between a first signal voltage and a second signal voltage comprising first, second, third, fourth and fifth modulators, a cathode-ray oscilloscope having two pairs of deflecting elements with the axes of the pairs mutually perpendicular, means for supplying to said first modulator said first signal voltage and a first carrier voltage to produce a first sideband voltage having a given frequency, means for supplying to said second modulator said second signal voltage and said first carrier voltage to produce a second sideband voltage having said given frequency, means for supplying to said third modulator said second signal voltage and a second carrier voltage in quadrature with said first carrier voltage to produce a third sideband voltage of said given frequency, circuits from said first and second modulators to said fourth modulator for supplying to said fourth modulator said first sideband voltage as a signal voltage and said second sideband voltage as a carrier voltage to produce a lower sideband output of zero frequency, circuits from said first and third modulators to said fifth modulator for supplying to said fifth modulator said first sideband voltage as a signal voltage and said third sideband voltage as a carrier voltage to produce a lower sideband output of zero frequency, connections from said fourth modulator to one of said pairs of deflecting elements for supplying thereto said lower sideband output from said fourth modulator, and connections from said fifth modulator to the other of said pairs for supplying thereto said lower sideband output from said fifth modulator.

4. A method of determining phase difference between two voltages which comprises modulating a given carrier voltage with one of said two voltages to produce a first sideband voltage, modulating said given carrier voltage with the other of said two voltages to produce a second sideband voltage having the same frequency as said first sideband voltage, producing a second carrier voltage whose magnitude is equal to that of said first carrier voltage and whose phase is in quadrature relation to that of said first carrier voltage, modulating said second carrier voltage with said other of said two first-mentioned voltages to produce a third sideband voltage having the same frequency as said first sideband voltage, modulating said second sideband voltage with said first sideband voltage to produce a direct current whose magnitude has a given proportionality to the real component of the vector ratio of said two first-mentioned voltages, modulating said third sideband with said first sideband to produce a direct current whose magnitude has said given proportionality to the imaginary component of said ratio, and combining effects of said direct currents to indicate said phase difference.

JOHN G. KREER, JR.

References Cited in the file of this patent

UNITED STATES PATENTS

| Number | Name | Date |
|---|---|---|
| 1,564,303 | Wold | Dec. 8, 1925 |
| 1,839,290 | Bailey | Jan. 5, 1932 |
| 2,166,991 | Guanella | July 25, 1939 |
| 2,213,874 | Wagstaffe | Sept. 3, 1940 |
| 2,234,587 | Budenbom | Mar. 11, 1941 |
| 2,238,129 | Paul | Apr. 15, 1941 |
| 2,247,546 | Hugenholtz | Feb. 24, 1942 |
| 2,305,614 | Goldstein | Dec. 22, 1942 |
| 2,411,876 | Hansen | Dec. 3, 1946 |
| 2,411,916 | Woodyard | Dec. 3, 1946 |